(12) United States Patent
Lavigne

(10) Patent No.: US 7,305,507 B2
(45) Date of Patent: *Dec. 4, 2007

(54) MULTI-STAGE ROUND ROBIN ARBITRATION SYSTEM

(75) Inventor: Bruce E. Lavigne, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/212,146

(22) Filed: Aug. 26, 2005

(65) Prior Publication Data

US 2005/0283562 A1    Dec. 22, 2005

Related U.S. Application Data

(63) Continuation of application No. 10/091,768, filed on Mar. 5, 2002, now Pat. No. 6,954,812.

(51) Int. Cl.
*G06F 13/00* (2006.01)
*G06F 13/368* (2006.01)
*G06F 12/00* (2006.01)

(52) U.S. Cl. .................. 710/120; 710/111; 710/243

(58) Field of Classification Search ............ 710/111, 710/120, 243
See application file for complete search history.

(56) References Cited

U.S. PATENT DOCUMENTS 4,511,959 A * 4/1985 Nicolas et al. ............. 710/120
5,053,942 A * 10/1991 Srini ......................... 710/317
5,519,837 A * 5/1996 Tran .......................... 710/111
5,666,488 A * 9/1997 Joh ............................ 709/253
5,680,554 A * 10/1997 Baek ......................... 710/107
5,729,702 A * 3/1998 Creedon et al. ........... 710/111
5,832,278 A * 11/1998 Pham ........................ 710/243
5,930,487 A * 7/1999 Story et al. ................ 710/120
6,157,978 A * 12/2000 Ng et al. ................... 710/240

(Continued)

FOREIGN PATENT DOCUMENTS

EP    0 749 072 A2 * 12/1996

OTHER PUBLICATIONS

Model Checking in an Industrial Environment—Hensel et al.—Oct. 2002.*

(Continued)

*Primary Examiner*—Mark H. Rinehart
*Assistant Examiner*—Jeremy S Cerullo

(57) ABSTRACT

Round robin arbitration system includes a first round robin arbitration module and a second round robin arbitration module. The first round robin arbitration module has a first bit width. It is configured to partition a plurality of requests into a plurality of blocks of requests, to select a block having one or more active requests using round robin arbitration, and to generate a first index corresponding to the selected block. The second round robin arbitration module has a second bit width. It is configured to store each request of the selected block, to select each active request of the selected block using round robin arbitration, to generate a second index corresponding to the selected active request, and to generate a first signal for synchronizing operation of the first and second modules. The round robin arbitration system has a bit width that is a product of the first and second bit width.

20 Claims, 4 Drawing Sheets

U.S. PATENT DOCUMENTS

| | | | |
|---|---|---|---|
| 6,311,249 B1 * | 10/2001 | Min et al. | 710/111 |
| 6,487,213 B1 * | 11/2002 | Chao | 370/418 |
| 6,954,812 B2 * | 10/2005 | Lavigne | 710/243 |
| 7,236,497 B2 * | 6/2007 | Kurupati | 370/447 |
| 2004/0243752 A1 * | 12/2004 | O'Connor et al. | 710/243 |

OTHER PUBLICATIONS

Round-Robin Arbiter Design and Generation—Shin et al.—Oct. 2002.*

* cited by examiner

MULTI-STAGE ROUND ROBIN ARBITRATION SYSTEM

This patent application is a Continuation of commonly-owned patent application Ser. No. 10/091,768, filed on Mar. 5, 2002 now U.S. Pat No. 6,954,812, entitled "ROUND ROBIN ARBITRATION SYSTEM", by Bruce E. LaVigne, which is incorporated herein by reference.

BACKGROUND OF THE INVENTION

1. Field of the Invention

The present invention generally relates to arbitration systems. More particularly, the present invention relates to round robin arbitration systems.

2. Related Art

A device or a system has numerous resources. One or more requesters may request to use the numerous resources. Round robin arbitration ensures that the requesters have equal access to the numerous resources. A request bit corresponds to each requester.

Round robin arbitration is a manner of choosing all elements in a list, set, or group equally in some rational order, usually from the top to the bottom of a list and then starting again at the top of the list and so on. In addition, round robin arbitration is characterized by sequential, cyclical allocation of resources to numerous requesters.

Generally, a selection in a round robin arbitration is based on the previous selected request bit and the current request bits seeking access to a particular resource. Moreover, the round robin arbitration outputs an index corresponding to the selected request bit.

In conventional round robin arbiters, the entire round robin arbitration is typically performed with combinational logic in one clock cycle. However, as the clock frequency increases, it becomes difficult to design large bit width round robin arbiters using only combinational logic.

In an effort to overcome the difficulties associated with large scale combinational logic, some designers have divided their round robin arbiter into in multiple stages. In effect, one stage chooses the sub-block which the next stage uses. The second stage tracks the last selection from each sub-block. Unfortunately, this uses many flip-flops and has the added disadvantage that it does not produce results in true round-robin fashion.

In yet another conventional round robin arbiter design approach, true round robin arbitration is performed. However, all variables for each arbitration are re-computed. Thus, in this case arbitration results are produced only once every 2 clock cycles.

Therefore, the typical prior art round robin arbitration schemes are all problematic and suffer different drawbacks.

SUMMARY OF THE INVENTION

A round robin arbitration system is disclosed. The round robin arbitration system includes a first round robin arbitration module and a second round robin arbitration module. The first round robin arbitration module has a first bit width. Moreover, it is configured to partition a plurality of requests into a plurality of blocks of requests, to select a block having one or more active requests using round robin arbitration, and to generate a first index corresponding to the selected block.

The second round robin arbitration module has a second bit width. Moreover, it is configured to store each request of the selected block, to select each active request of the selected block using round robin arbitration, to generate a second index corresponding to the selected active request, and to generate a first signal for synchronizing operation of the first and second round robin modules. In addition, the round robin arbitration system has a bit width that is a product of the first and second bit widths.

BRIEF DESCRIPTION OF THE DRAWINGS

The accompanying drawings, which are incorporated in and form a part of this specification, illustrate embodiments of the invention and, together with the description, serve to explain the principles of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may, be included within the spirit and scope of the invention as defined by the appended claims. Furthermore, in the following detailed description of the present invention, numerous specific details are set forth in order to provide a thorough understanding of the present invention.

According to an embodiment of the present invention, a round robin arbitration system uses a two-stage design. Moreover, one of the stages generates a signal to synchronize the operation of the first stage and the second stage. Unlike prior arbitration system designs, the round robin arbitration system can have large bit widths and still operate at high clock frequencies.

Figure 1:
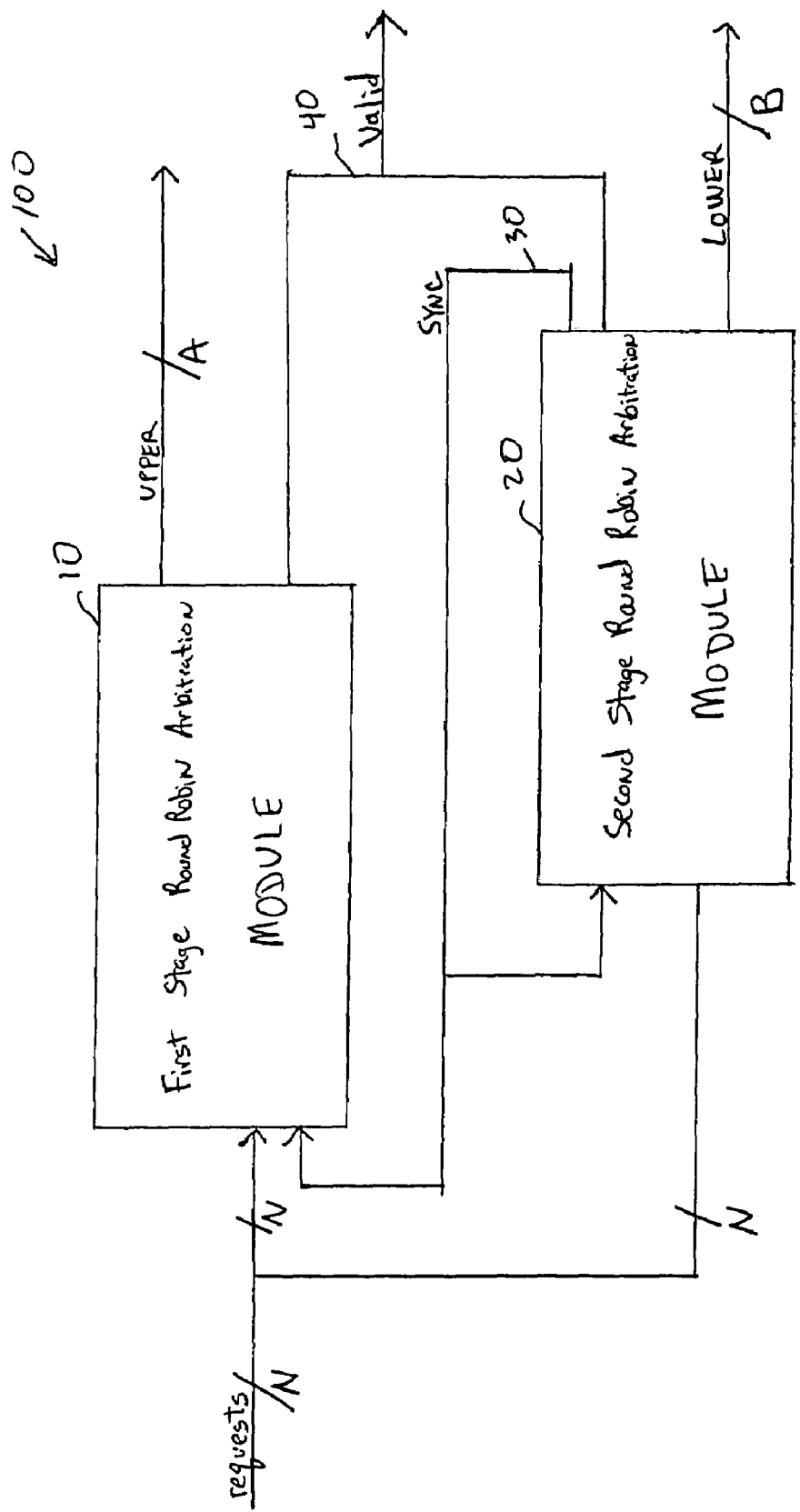
FIG. 1 illustrates a block diagram of a round robin arbitration system in accordance with an embodiment of the present invention.

FIG. 1 illustrates a block diagram of a round robin arbitration system 100 in accordance with an embodiment of the present invention. The round robin arbitration system 100 includes a first stage round robin arbitration module 10 and a second stage round robin arbitration module 20. The round robin arbitration system 100 is able to operate at higher clock frequencies that the conventional single stage round robin arbiter. Moreover, the round robin arbitration system 100 produces true round robin results, one result every clock cycle. Although two stages were used in this embodiment, the round robin arbitration system 100 can have more than two stages. The additional stages widen the bit width of the round robin arbitration system 100 such that the bit width of the round robin arbitration system 100 becomes the product of each bit width of each stage.

Specifically, the round robin arbitration system 100 can arbitrate among large numbers of requests at high clock frequencies. As illustrates in FIG. 1, the round robin arbitration system 100 receives N requests as input. In an embodiment, N is 256. It should be understood that N can be any other number.

The N requests are inputted into the first stage round robin arbitration module 10 and the second stage round robin arbitration module 20. The first stage round robin arbitration module 10 outputs a first index (i.e., UPPER) which is A bits for the selection of the request by the round robin arbitration system 100. The second stage round robin arbitration module 20 outputs a second index (i.e., LOWER) which is B bits for the selection of the request by the round robin arbitration system 100. The combination of the first index and the second index forms the index corresponding to the selection of the request by the round robin arbitration system 100. For example, if N is 256, the first index is four bits and the second index is four bits. Thus, the 8-bit index corresponds to the request that has been selected by the round robin arbitration system 100 from the plurality of received requests.

As illustrated in FIG. 1, the second stage round robin arbitration module 20 outputs a signal 30 for synchronizing the operation of the first stage round robin arbitration module 10 and the second stage round robin arbitration module 20. Moreover, a valid signal 40 is generated based on information from the first stage round robin arbitration module 10 and the second stage round robin arbitration module 20. The valid signal 40 indicates whether the first index (i.e., UPPER) and the second index (i.e., LOWER) are valid.

Figure 2:
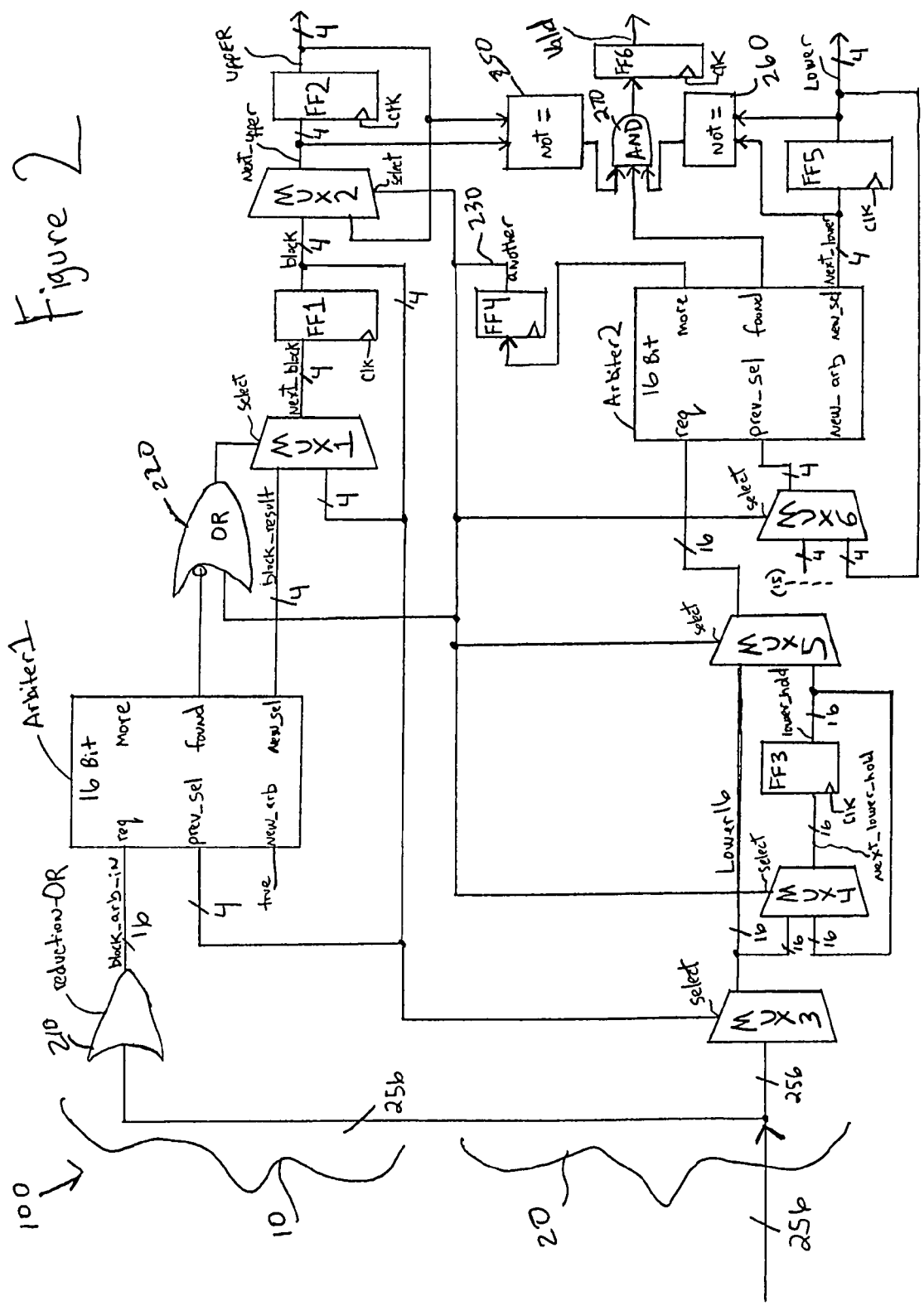
FIG. 2 illustrates a circuit diagram of a round robin arbitration system in accordance with an embodiment of the present invention.

FIG. 2 illustrates a circuit diagram of a round robin arbitration system 100 in accordance with an embodiment of the present invention. As illustrated in FIG. 2, the round robin arbitration system 100 has a 256 bit width. Thus, the round robin arbitration system 100 can arbitrate among 256 requests. The round robin arbitration system 100 includes a first stage 10 and a second stage 20. It should be understood that the round robin arbitration system 100 can be configured to other bit widths.

Figure 3A:
FIGS. 3A-3C illustrate how requests are processed by a round robin arbitration system in accordance with an embodiment of the present invention.
Figure 3B:
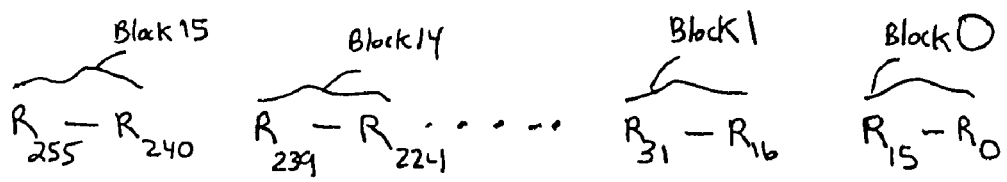
Figure 3C:
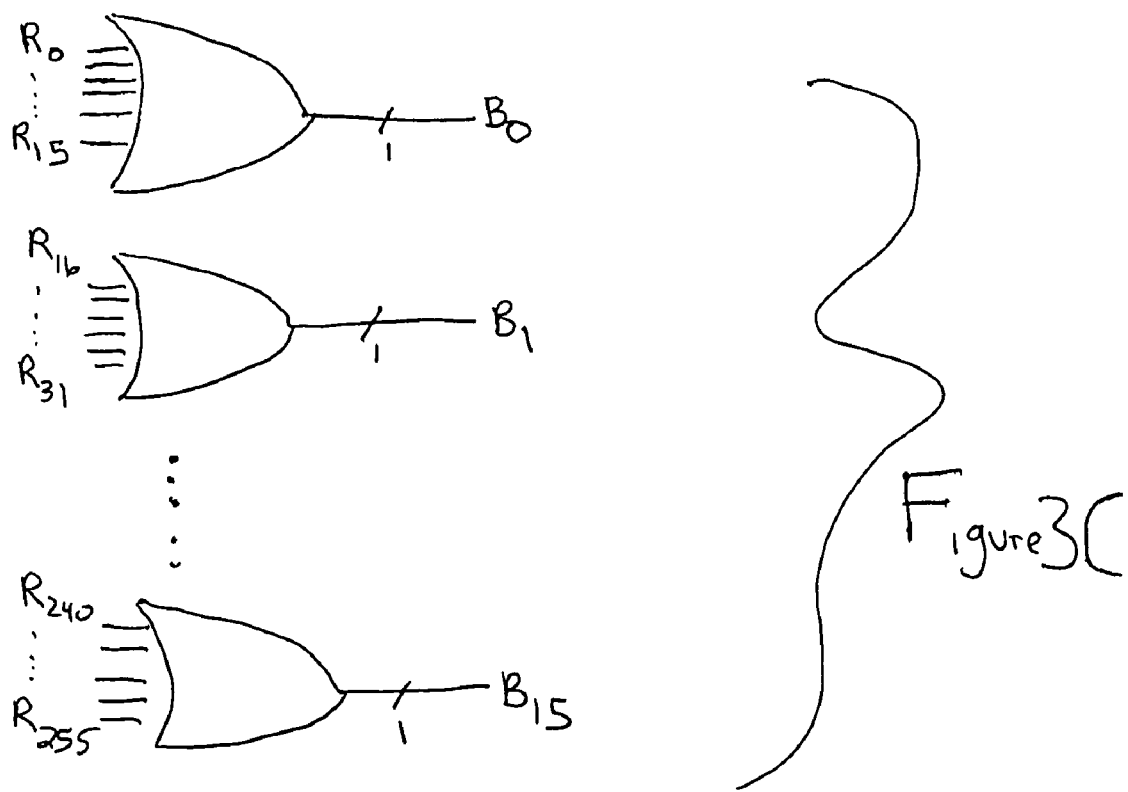

The first stage 10 receives the 256 request bits, each corresponding to a requester. A request is active ("High") if the corresponding requester wants to access a resource. Otherwise, the request is inactive ("low"). FIG. 3A illustrates the 256 request bits $R_{256}$-$R_0$ that are received by the first stage 10. Continuing with FIG. 2, in the first stage 10, the 256 requests are coupled to a reduction-OR circuit 210. The reduction-OR circuit 210 partitions the 256 request bits into 16 blocks of 16 request bits each. FIG. 3B illustrates how the request bits $R_{256}$-$R_0$ are partitioned into blocks (e.g., Block15-Block0). Moreover, the reduction-OR circuit 210 performs an OR operation on each block of request bits to generate a block bit (e.g., $B_{15}$-$B_0$) for each of the 16 blocks, as illustrated in FIG. 3C. The block bit indicates whether the corresponding block has one or more active request bits.

Continuing with FIG. 2, the output (i.e., 16 bits) of the reduction-OR circuit 210 is inputted into the Arbiter1, which is a 16-bit round robin arbiter. The Arbiter1 selects a block bit corresponding to a block having one or more active request bits based on round robin arbitration and the previous selection prev_sel. Moreover, the Arbiter1 generates a new selection index new_sel corresponding to the selected block bit. For example, if block1 is selected, the new selection index new_sel is 0001, a four bit index.

The new selection index new_sel (or block_result) is inputted into the multiplexor MUX1. The selector of MUX1 is controlled by an OR gate 220. The OR gate 220 has a first inverted input coupled to the Found terminal of the Arbiter1 and a second input coupled to the another signal 230 which is outputted by the Arbiter2, whereas the another signal 230 synchronizes the first stage 10 and the second stage 20. The Found terminal of the Arbiter1 indicates a valid arbitration result by the Arbiter1. Moreover, the output of MUX1 is coupled to flip-flop FF1. In addition, the output of FF1 is coupled to MUX2 and is inputted into MUX1 and into the previous selection prev_sel terminal of the Arbiter1. The selector of MUX2 is controlled by another signal 230. The output of MUX2 is coupled to FF2. The output of FF2 is inputted into MUX2. Moreover, FF2 outputs the UPPER bits (i.e., four bits) of the selected request bit made by the round robin arbitration system 100.

The second stage 20 receives the 256 request bits, each corresponding to a requester. The 256 request bits are inputted into the multiplexor MUX3. The selector of MUX3 is controlled by the output of FF1, whereas the output of FF1 indicates the selected block. The MUX3 outputs the request bits (i.e., 16 request bits) of the selected block and couples the request bits (i.e., 16 request bits) to MUX4 and to MUX5. MUX4 is coupled to FF3. The selector of MUX4 is controlled by another signal 230. The output of FF3 is coupled to MUX5 and MUX4. The selector of MUX5 is controlled by another signal 230. Moreover, the output of MUX5 is inputted into Arbiter2 to enable the Arbiter2 to arbitrate among the active request bits of the selected block. FF3 stores the request bits of the selected block so that Arbiter2, which is a 16-bit round robin arbiter, can arbitrate among the active request bits of the selected block.

The Arbiter2 selects each of the active request bits of the selected block based on round robin arbitration and the previous selection prev_sel. Moreover, the Arbiter2 generates a new selection index new_sel corresponding to the selected active request bit. For example, if active request bit 4 is selected, the new selection index new_sel is 0100, a four bit index. The new selection index new_sel terminal of Arbiter2 is coupled to FF5. Moreover, FF5 outputs the LOWER bits (i.e., four bits) of the selected request bit made by the round robin arbitration system 100. The Arbiter2 outputs (via terminal MORE) a signal which is coupled to the FF4 which outputs another signal 230 which synchronizes the first stage 10 and the second stage 20. The signal at the terminal MORE goes "high" to indicate that the Arbiter2 has produced a first arbitration result by selecting one of the active request bits of the selected block and to indicate that there is another active request bit available (in the selected block) for selection before the Arbiter2 wraps. As illustrated in FIG. 2, the output of MUX6 is coupled to the previous selection prev_sel terminal of Arbiter2. The selector of MUX6 is controlled by another signal 230. Moreover, the output of FF5 is inputted into MUX6. The wrap value 15 (or 1111) is also inputted into MUX6, whereas the wrap value 15 (or 1111) causes the Arbiter2 to wrap.

In addition, the VALID signal is outputted by the FF6, whereas the valid signal indicates whether the UPPER index generated by the first stage 10 is valid and whether the LOWER index generated by the second stage 20 is valid. The VALID signal prevents the same active request bit from being selected two clocks cycles in a row. In particular, the output (i.e., next_UPPER) of MUX2 and the output (i.e., UPPER) of FF2 are compared 250 to determine whether they are not equal. The output (i.e., next_LOWER) of new_sel terminal of Arbiter2 and the output (i.e., LOWER) of FF5 are compared 260 to determine whether they are not equal. The result of compare 250, the result of compare 260, and the Found terminal of Arbiter2 (whereas the Found terminal of the Arbiter1 indicates a valid arbitration result by the Arbiter2) are inputted into the AND gate 270. The output of the AND gate 270 is coupled to the FF6 which outputs the VALID signal.

It should be understood that Arbiter1 and Arbiter2 can have bit widths other than 16 bits. The bit width of the Arbiter1 and the bit width of the Arbiter2 depend on desired bit width for the round robin arbitration system 100. The round robin arbitration system 100 has a bit width that is a product of the bit width of the Arbiter1 and the bit width of the Arbiter2.

In practice, after Arbiter1 (of the first stage 10) selects a block based on round robin arbitration, the Arbiter2 (of the second stage 20) selects an active request bit from the selected block. If the MORE terminal goes "High", another signal 230 also goes "High" after one clock cycle. Although Arbiter1 can proceed to select the next block, another signal 230 causes MUX1 and MUX2 to maintain the UPPER index of the selected block, which is being processed by the Arbiter2, rather than changing the UPPER index to correspond with the next selected block.

Similarly, once another signal 230 goes "High", MUX4 and MUX5 continue to output the request bits of the selected block rather than the request bits of the next selected block. The FF3 stores the request bits of the selected block. Hence, the Arbiter2 can proceed processing the active request bits of the selected block. Moreover, another signal 230 causes the Arbiter2 to receive (via MUX6) at its prev_sel terminal the output of the FF5 to perform round robin arbitration rather than causing the Arbiter2 to receive the wrap value 15 (or 1111) which causes the Arbiter2 to wrap. In sum, another signal synchronizes the operation of the first phase 10, the second phase 20, Arbiter1, and Arbiter2.

Figure 4:
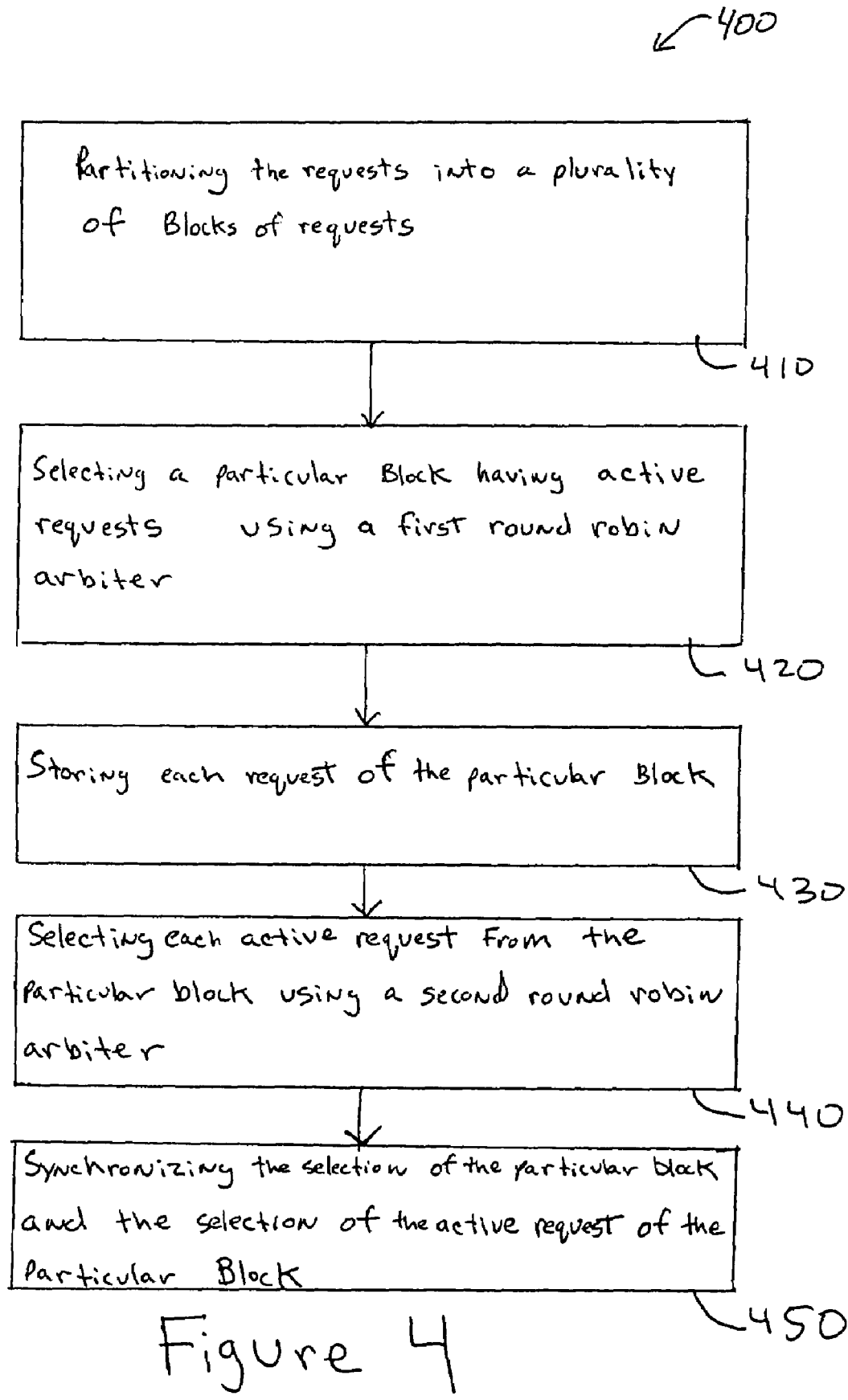
FIG. 4 illustrates a flow chart showing a method of arbitrating among a plurality of requests in accordance with an embodiment of the present invention.

FIG. 4 illustrates a flow chart showing a method 400 of arbitrating among a plurality of requests in accordance with an embodiment of the present invention.

At Block 410, the requests are partitioned into a plurality of blocks of requests. At Block 420, a particular block having one or more active requests using a first round robin arbiter. At Block 430, each request of the particular block is stored.

Continuing at Block 440, each active request of the particular block is selected using a second round robin arbiter. At Block 450, the selection of the particular block and the selection of the active request of the particular block are synchronized.

Therefore, a round robin arbitration system has been described. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A round robin arbitration system, comprising:
   a first round robin arbitration module for partitioning a plurality of requests that are received by said first round robin arbitration module into a plurality of blocks of requests and selecting a block of requests from amongst said plurality of blocks of requests having one or more active requests using round robin arbitration; and
   a second round robin arbitration module for storing requests of said selected block and for selecting each active request of said selected block using round robin arbitration.

2. A round robin arbitration system as recited in claim 1 wherein said first round robin arbitration module generates a first index corresponding to said selected block, wherein said second round robin module includes a first multiplexor which receives said plurality of requests and outputs, controlled by said first index, said requests of said selected block, and wherein said second round robin arbitration module generates a first signal for synchronizing operation of said first and second round robin modules.

3. A round robin arbitration system as recited in claim 1 wherein said second round robin module includes a first set of flip-flops for storing said requests of said selected block.

4. A round robin arbitration system as recited in claim 1 wherein said second round robin arbitration module generates a second index corresponding to said selected active request, and wherein said second round robin module includes a round robin arbiter which receives said requests of said selected block, selects each active request of said selected block, and generates said second index.

5. A round robin arbitration system as recited in claim 1 wherein said first round robin arbitration module generates a first index corresponding to said selected block, wherein said second round robin arbitration module generates a second index corresponding to said selected active request, and wherein a second signal is generated based on information from said first and second round robin modules, said second signal indicating whether said first index and said second index are valid.

6. A round robin arbitration system as recited in claim 1 wherein said first round robin module includes a reduction-OR circuit for partitioning said requests into a plurality of blocks and for performing an OR operation on each block of requests.

7. A round robin arbitration system as recited in claim 6 wherein said first round robin arbitration module generates a first index corresponding to said selected block, and wherein said first round robin module includes a round robin arbiter which receives output from said reduction-OR circuit, selects said block having one or more active requests, and generates said first index.

8. A round robin arbitration system as recited in claim 1 wherein said first round robin arbitration module has a first bit width, wherein said second round robin arbitration module has a second bit width, and wherein said round robin arbitration system has a bit width that is a product of said first and second bit widths.

9. A round robin arbitration system, comprising:
   a first round robin arbiter for selecting a block of requests from amongst a plurality of blocks of requests having one or more active requests using round robin arbitration;
   a storage unit for storing said requests of said selected block; and
   a second round robin arbiter coupled to said storage unit and for selecting each active request of said selected block using round robin arbitration.

10. A round robin arbitration system as recited in claim 9 further including:
   said first round robin arbiter for generating a first index corresponding to said selected block;

said second round robin arbiter for generating a first signal for synchronizing operation of said first and second round robin arbiters;
a first multiplexor which receives a plurality of requests and outputs, controlled by said first index, said requests of said selected block; and
a second multiplexor which receives said output of said first multiplexor and has an output, controlled by said first signal, coupled to said second round robin arbiter.

11. A round robin arbitration system as recited in claim 10 wherein said storage unit comprises a first set of flip-flops for storing said requests of said selected block and having an output coupled to said second multiplexor, wherein said round robin arbitration system further includes:
a third multiplexor which receives said output of said first multiplexor and said output of said first set of flip-flops and which has an output, controlled by said first signal, coupled to said first set of flip-flops; and
a fourth multiplexor which receives a particular value and said second index and has an output, controlled by said first signal, which is coupled to said second round robin arbiter.

12. A round robin arbitration system as recited in claim 9 wherein said first round robin arbiter generates a first index corresponding to said selected block, wherein said second round robin arbiter generates a second index corresponding to said selected active request, and wherein a second signal is generated based on information generated by said first and second round robin arbiters, said second signal indicating whether said first index and said second index are valid.

13. A round robin arbitration system as recited in claim 9 further including
a reduction-OR circuit for partitioning a plurality of requests into a plurality of blocks and for performing an OR operation on each block of requests, wherein said reduction-OR circuit has an output coupled to said first round robin arbiter.

14. A round robin arbitration system as recited in claim 13 wherein said second round robin arbiter generates a first signal for synchronizing operation of said first and second round robin arbiters, wherein said first round robin arbiter generates a first index corresponding to said selected block, wherein said second round robin arbiter generates a second index corresponding to said selected active request, wherein said first index is coupled to a first multiplexor controlled by a OR circuit which receives said first signal, wherein said first multiplexor is coupled to a flip-flop, and wherein said flip-flip is coupled to a second multiplexor controlled by said first signal and is coupled to said first round robin arbiter.

15. A round robin arbitration system as recited in claim 9 wherein said first round robin arbiter has a first bit width, wherein said second round robin arbiter has a second bit width, and wherein said round robin arbitration system has a bit width that is a product of said first and second bit widths.

16. A method of arbitrating among a plurality of requests, comprising:
a) partitioning said plurality of requests into a plurality of blocks of requests;
b) selecting a particular block of requests from amongst said plurality of blocks of requests having one or more active requests using a first round robin arbiter and storing each request of said particular block; and
c) selecting each active request of said particular block using a second round robin arbiter.

17. A method as recited in claim 16 wherein said step b) includes generating a first index corresponding to said particular block.

18. A method as recited in claim 16 wherein said step c) includes generating a second index corresponding to said selected active request.

19. A method as recited in claim 16 further comprising:
synchronizing said selecting said particular block and said selecting each active request of said particular block, wherein said synchronizing includes generating a first signal for synchronizing operation of said first and second round robin arbiters.

20. A method as recited in claim 16 wherein said first round robin arbiter has a N bit width, wherein said second round robin arbiter has a Y bit width, and wherein said plurality of requests includes (N * Y) requests.

* * * * *

UNITED STATES PATENT AND TRADEMARK OFFICE
CERTIFICATE OF CORRECTION

| | | |
|---|---|---|
| PATENT NO. | : 7,305,507 B2 | |
| APPLICATION NO. | : 11/212146 | |
| DATED | : December 4, 2007 | |
| INVENTOR(S) | : Bruce E. Lavigne | |

It is certified that error appears in the above-identified patent and that said Letters Patent is hereby corrected as shown below:

In column 8, line 6, in Claim 14, delete "flip-flip" and insert -- flip-flop --, therefor.

Signed and Sealed this

Twenty-fourth Day of June, 2008

JON W. DUDAS
*Director of the United States Patent and Trademark Office*